(12) United States Patent
Susaki (10) Patent No.: US 9,651,660 B2
(45) Date of Patent: May 16, 2017

(54) DEVICE AND METHOD FOR PROCESSING ECHO SIGNALS, COMPUTER READABLE MEDIA STORING ECHO SIGNAL PROCESSING PROGRAM AND WAVE RADAR APPARATUS

(71) Applicant: Furuno Electric Co., Ltd., Nishinomiya (JP)

(72) Inventor: Hironori Susaki, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 323 days.

(21) Appl. No.: 14/322,862

(22) Filed: Jul. 2, 2014

(65) Prior Publication Data

US 2015/0048971 A1    Feb. 19, 2015

(30) Foreign Application Priority Data

Jul. 3, 2013  (JP) ................. 2013-139972

(51) Int. Cl.
*G01S 13/89* (2006.01)
*G01S 7/24* (2006.01)
*G01S 13/95* (2006.01)

(52) U.S. Cl.
CPC ............. *G01S 13/89* (2013.01); *G01S 7/24* (2013.01); *G01S 13/956* (2013.01)

(58) Field of Classification Search
CPC .. G01S 13/89; G01S 7/04–7/24; G01S 13/956
See application file for complete search history.

(56) References Cited

U.S. PATENT DOCUMENTS 6,084,565 A * 7/2000 Kiya ................. G01S 7/06
                                              345/635
7,541,973 B2 * 6/2009 Fujikawa ............ G01S 7/04
                                              342/176

(Continued)

FOREIGN PATENT DOCUMENTS

JP    H03262990 A    11/1991
JP    2002318115 A    10/2002

(Continued)

*Primary Examiner* — Matthew M Barker
(74) *Attorney, Agent, or Firm* — Alleman Hall McCoy Russell & Tuttle LLP (57) ABSTRACT

An echo signal processing device is provided. The device includes an image generating module configured to generate an echo image at a plurality of timings, the echo image generated based on echo signals received by an antenna installed in a movable body. The device also includes a positional information acquiring module configured to acquire absolute positional information of the movable body. The device also includes an analytic area specifying module configured to specify an analytic area in the echo image by an absolute position, based on the absolute positional information. The device also includes a storage configured to store analytic area images, each analytic area images being a part of each echo image, the part corresponding to the analytic area. The device also includes a calculating module configured to calculate echo signal information regarding the echo signals from the analytic area, based on the stored analytic area images.

6 Claims, 9 Drawing Sheets

(56) References Cited

U.S. PATENT DOCUMENTS

| | | | |
|---|---|---|---|
| 8,830,113 B2* | 9/2014 | Nishiyama | G01S 7/412 342/179 |
| 8,941,535 B2* | 1/2015 | Matsumoto | G01S 7/10 342/179 |
| 8,970,673 B2* | 3/2015 | Gostynski | G01C 11/06 348/145 |

FOREIGN PATENT DOCUMENTS

| | | |
|---|---|---|
| JP | 2003337170 A | 11/2003 |
| JP | 2005156192 A | 6/2005 |
| JP | 2012112674 A | 6/2012 |

* cited by examiner

DEVICE AND METHOD FOR PROCESSING ECHO SIGNALS, COMPUTER READABLE MEDIA STORING ECHO SIGNAL PROCESSING PROGRAM AND WAVE RADAR APPARATUS

CROSS-REFERENCE TO RELATED APPLICATION(S)

This application claims priority under 35 U.S.C. §119 to Japanese Patent Application No. 2013-139972, which was filed on 3 Jul. 2013, the entire disclosure of which is hereby incorporated by reference.

TECHNICAL FIELD

The present invention generally relates to an echo signal processing device, which calculates information regarding an echo signal received by an antenna for transceiving radio waves, and also relates to method and program for processing echo signals, and a wave radar apparatus.

BACKGROUND OF THE INVENTION

Conventionally, echo signal processing devices for calculating information regarding an echo signal received by an antenna based on the echo signal, have been known. For example, JP1991-262990A discloses a wave observation radar for calculating echo signal information (e.g., a wave direction and a wave velocity) by determining a processing range (analytic area) of sea surface reflection signals in a predetermined area and performing two-dimensional FFT (Fast Fourier Transform) for the analytic area.

Meanwhile, conventionally, such analytic area described above is set with reference to a position of, for example, a ship in which the radar is installed. Specifically, in any radar image which is updated with time, the position of the analytic area is fixed to the position with reference to the ship. However, in this case, the position of the analytic area also moves as the ship moves, and therefore, an image of a wave extracted from the analytic area contains a relative velocity component (Doppler component) to an actual wave. As a result, accurate echo signal information cannot be calculated.

SUMMARY OF THE INVENTION

The present invention is made in view of the above situations, and mainly aims to accurately calculate information of an echo signal.

According to one aspect of the present invention, an echo signal processing device is provided, which includes an image generating module configured to generate an echo image at a plurality of timings, the echo image generated based on echo signals, each of the echo signals received by an antenna installed in a movable body and configured to transceive a radio wave that causes the echo signal. The echo signal processing device also includes a positional information acquiring module configured to acquire absolute positional information of the movable body. The echo signal processing device also includes an analytic area specifying module configured to specify an analytic area in the echo image by an absolute position, based on the absolute positional information acquired by the positional information acquiring module. The echo signal processing device also includes a storage configured to store a plurality of analytic area images, each of the analytic area images being a part of each of the echo images, the part corresponding to the analytic area. The echo signal processing device also includes a calculating module configured to calculate echo signal information that is information regarding the echo signals from the analytic area, based on the plurality of analytic area images stored in the storage.

With this configuration, the echo signal information can be calculated accurately.

The positional information acquiring module preferably sequentially acquires the absolute positional information of the movable body at a plurality of timings. The analytic area specifying module preferably specifies the analytic area based on the absolute positional information of the movable body every time the absolute positional information is acquired.

While the calculating module calculates the echo signal information, the positional information acquiring module preferably acquires latest absolute positional information of the movable body at a timing that the storage can store an analytic area image of a next analytic area that is specified by the analytic area specifying module.

The positional information acquiring module is preferably provided as a GNSS receiving module configured to receive navigation signals.

According another aspect of the present invention, a wave radar apparatus is provided, which includes an antenna to be installed in a ship that is a movable body for moving on water, and configured to transceive radio waves. The wave radar apparatus also includes the echo signal processing device of any of the aspects described above, configured to calculate wave information that is information regarding the echo signals from waves on the surface of the water, based on a plurality of echo images obtained using the echo signals received by the antenna. The wave radar apparatus also includes a display unit configured to display the wave information calculated by the echo signal processing device.

According further another aspect of the present invention, a method of processing echo signals is provided, which includes generating an echo image at a plurality of timings, the echo image generated based on the echo signals, each of the echo signals received by an antenna installed in a movable body and configured to transceive a radio wave that causes the echo signal. The method also includes acquiring absolute positional information of the movable body. The method also includes specifying an analytic area in the echo image by an absolute position, based on the absolute positional information of the movable body. The method also includes storing a plurality of analytic area images, each of the analytic area images being a part of each of the echo images, the part corresponding to the analytic area. The method also includes calculating echo signal information that is information regarding the echo signals from the analytic area, based on the plurality of analytic area images.

According further another aspect of the present invention, a computer readable media configured to store a computer executable program in a non-transitory manner, which upon execution by a processor of a computer causes the computer to perform echo signal processing is provided. The echo signal processing includes generating an echo image at a plurality of timings, the echo image generated based on the echo signals, each of the echo signals received by an antenna installed in a movable body and configured to transceive a radio wave that causes the echo signal. The echo signal processing also includes acquiring absolute positional information of the movable body. The echo signal processing also includes specifying an analytic area in the echo image by an absolute position, based on the absolute positional information of the movable body. The echo signal processing also includes storing a plurality of analytic area images, each of the analytic area images being a part of each of the echo images, the part corresponding to the analytic area. The echo signal processing also includes calculating echo signal information that is information regarding the echo signals from the analytic area, based on the plurality of analytic area images.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

An echo signal processing device 10 according to one embodiment of the present invention, and a wave radar apparatus 1 provided with the echo signal processing device 10 are described with reference to the appended drawings. The wave radar apparatus 1 of this embodiment is installed, for example, in a ship (hereinafter, may be referred to as "the ship concerned" or simply as "the ship). The wave radar apparatus 1 generates an echo image by using reflection waves from a water surface, and can display the echo image. Moreover, in the wave radar apparatus 1 of this embodiment, the echo signal processing device 10 analyzes the reflection waves from the water surface and calculates ocean wave information (echo signal information), such as a wave direction and a wave height.

[Overall Configuration]

Figure 1:
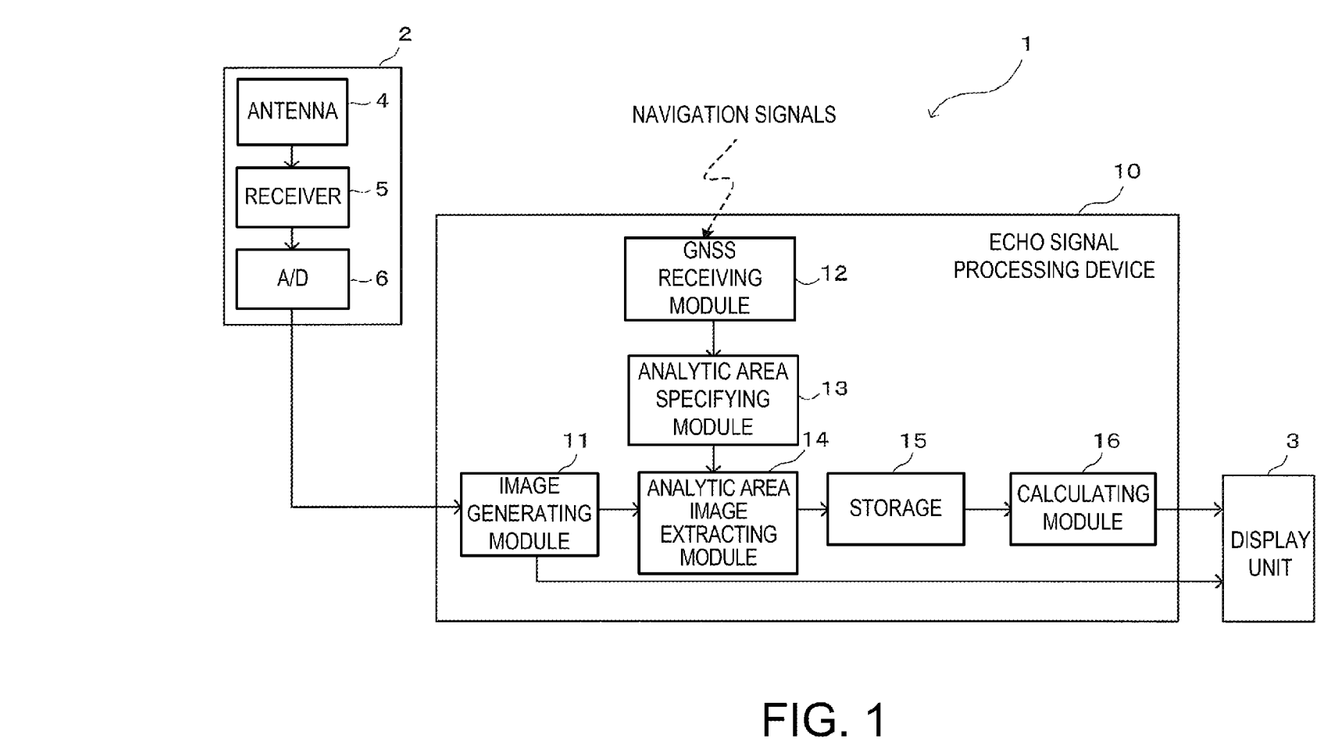
FIG. 1 is a block diagram illustrating a configuration of a wave radar apparatus according to one embodiment of the present invention.

FIG. 1 is a block diagram illustrating a configuration of a wave radar apparatus 1 according to this embodiment of the present invention. As illustrated in FIG. 1, the wave radar apparatus 1 of this embodiment includes an antenna unit 2, the echo signal processing device 10, and a display unit 3.

The antenna unit 2 includes an antenna 4, a receiver 5, and an A/D converter 6.

The antenna 4 is a radar antenna for transmitting (discharging) a pulsed radio wave having a strong directivity. Moreover, the antenna 4 receives the echo signal (reflection wave) from the water surface. Specifically, the antenna 4 receives the echo signal indicating the water surface. The wave radar apparatus 1 measures a time length from the transmission of the pulsed radio wave to the reception of the echo signal. Thus, the wave radar apparatus 1 can detect a distance to a cap of an ocean wave. The direction to which the ship opposes to the cap of the ocean wave is defined as a distance direction.

The antenna 4 rotates 360° in the horizontal plane, and rotates about a vertical axis. The antenna 4 repeats the transception of the pulsed radio waves while changing its transmitting direction (changing a rotating angle of the antenna 4). With this configuration, the wave radar apparatus 1 can detect the cap of the ocean wave over 360° around the ship in the plane. The antenna 4 of this embodiment rotates at 48 rpm, for example. In this case, the antenna 4 fully rotates once (e.g., 360°) in 1.25 seconds. Note that, the antenna 4 is not limited to the antenna which rotates mechanically in the horizontal plane as described above, and may be a phased array antenna having a plurality of antenna elements and for rotating the transceiving directions of the radio waves in the horizontal plane by controlling phases of the antenna elements. Alternatively, the antenna 4 may be an antenna set having a plurality of horn antennas to perform the tranception of the radio waves in the directions to which the respective antennas are oriented.

The receiver 5 detects the echo signal received by the antenna 4 and amplifies it. Among all the signals received by the antenna 4, the echo signal is the reflection wave from the water surface caused by the transmission signal from the antenna 4. The receiver 5 outputs the amplified echo signal to the A/D converter 6. The A/D converter 6 samples the echo signal in analog form and converts it into digital data (echo data) comprised of a plurality of bits. Here, a value of the echo data includes data indicating the ocean wave information of the echo signal received by the antenna 4. The A/D converter 6 outputs the echo data to the echo signal processing device 10.

The echo signal processing device 10 generates an echo image based on the reflection wave from the water surface, by using the echo data from the A/D converter 7. Moreover, the echo signal processing device 10 calculates the ocean wave information (may simply be referred to as "wave information) from the echo image. The configuration and operation of the echo signal processing device 10 are described later in detail.

Figure 2:
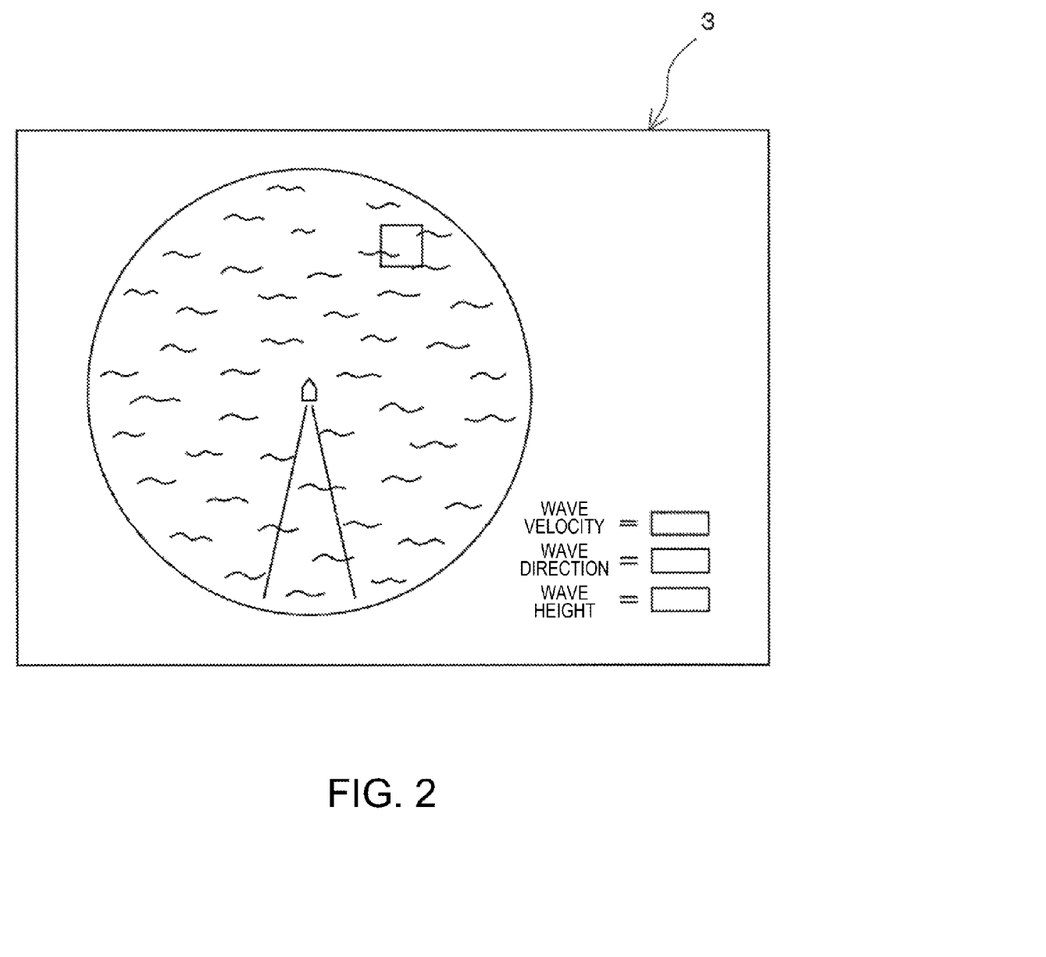
FIG. 2 is a view illustrating a display example of a display unit of the wave radar apparatus in FIG. 1.

FIG. 2 is a view illustrating a display example of the display unit 3. As illustrated in FIG. 2, the display unit 3 displays the echo image generated by the echo signal processing device 10 and the ocean wave information (e.g., a wave period, a wave velocity, a wave direction, and a wave height) calculated by the echo signal processing device 10. The display unit 3 sequentially displays the echo images, each generated every predetermined period of time. Thus, an operator can find out a state of the ocean wave near a position of the ship. Note that, although it is described later in detail, the rectangle displayed in the echo image in FIG. 2 indicates an analytic area which is a target area for analyzing the echo signal and calculating the ocean wave information. Note that, the shape of the analytic area is not limited to the rectangle described above, and may be any other shape.

[Configuration of Echo Signal Processing Device]

As illustrated in FIG. 1, the echo signal processing device 10 includes an image generating module 11, a GNSS receiving module 12 (positional information acquiring module), an analytic area specifying module 13, an analytic area image extracting module 14, a storage 15, and a calculating module 16. The echo signal processing device 10 is comprised of hardware including a CPU, a RAM, and a ROM (not illustrated). Moreover, the echo signal processing device 10 is comprised of software including an echo signal processing program stored in the ROM.

The echo signal processing program causes the echo signal processing device 10 to implement a method of processing the echo signals according to one embodiment of the present invention. The program can be installed externally. The program to be installed is distributed in a state where it is stored in a memory medium, for example. The hardware and the software operate in cooperation with each other. Thus, the echo signal processing device 10 can function as the image generating module 11, the GNSS receiving module 12, the analytic area specifying module 13, the analytic area image extracting module 14, the storage 15, and the calculating module 16.

The image generating module 11 generates the echo image based on the reflection waves from the water surface, by using the echo data from the A/D converter 7. The image generating module 11 generates a single echo image every time the antenna 4 fully rotates once, and generates the echo images at a plurality of timings. In this embodiment, the image generating module 11 generates a single echo image every 1.25 seconds, for example. The plurality of echo images generated by the image generating module 11 are outputted sequentially to the display unit 3 and the analytic area image extracting module 14.

The GNSS receiving module 12 receives navigation signals transmitted from navigation satellites (not illustrated) and acquires absolute positional information (latitude and longitude) of the ship, and information of a heading of the ship (heading information). The GNSS receiving module 12 acquires the absolute positional information of the ship and the heading information every predetermined period of time. Note that, "GNSS" is an abbreviation of Global Navigation Satellite Systems, and is a collective term for "GPS" operated in the U.S.A, "GALILEO" operated in Europe, and "GLONASS" operated in Russia.

The analytic area specifying module 13 specifies a target area for calculating the ocean wave information (analytic area), based on the absolute positional information of the ship and the heading information acquired by the GNSS receiving module 12.

Figure 3:
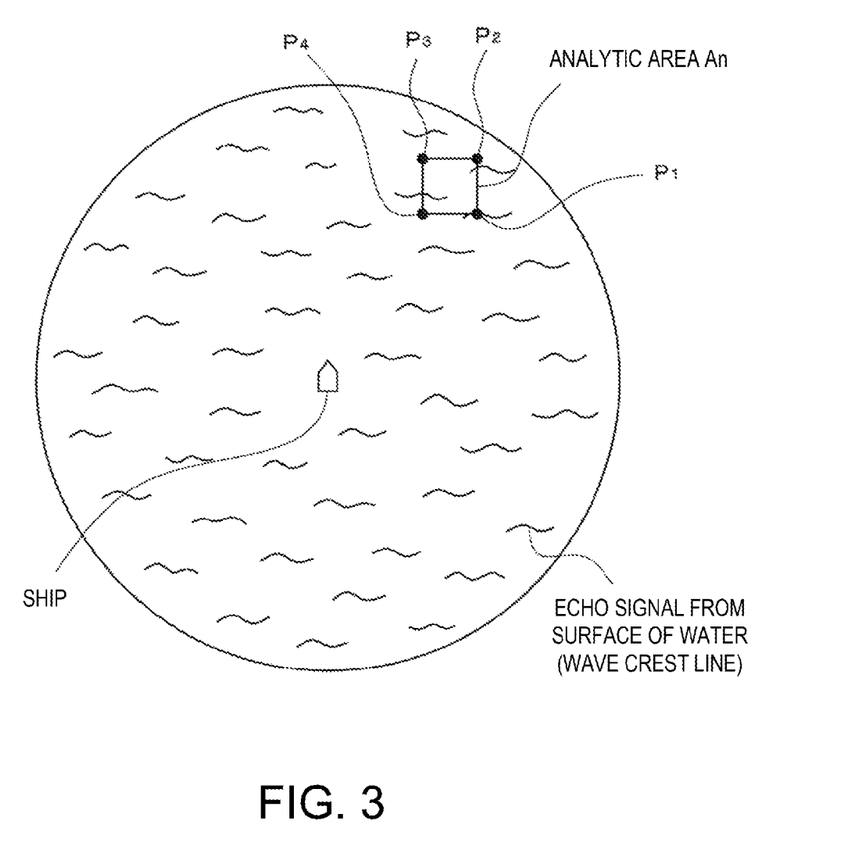
FIG. 3 is a view illustrating a horizontal area centering on a ship concerned and for describing setting of an analytic area.

FIG. 3 is a view illustrating a horizontal area centering on the ship and for describing setting of the analytic area. The analytic area specifying module 13 sets the analytic area to a position away from the ship by a predetermined distance. Further, the analytic area specifying module 13 specifies the analytic area set as above, by absolute position(s) (latitude(s) and longitude(s)). Specifically for example, the analytic area specifying module 13 sets four locations $P_1$, $P_2$, $P_3$ and $P_4$ with reference to the absolute position of the ship and specifies them by using absolute positions. Further, a rectangular area (here, square) formed by the four locations is specified as an analytic area $A_n$ (n=1, 2, ...). The analytic area specifying module 13 specifies the analytic area $A_n$ every time the GNSS receiving module 12 acquires the absolute positional information of the ship.

The analytic area image extracting module 14 extracts, from each of the plurality of echo images outputted sequentially from the image generating module 11, a part of the echo image corresponding to the analytic area $A_n$ specified by the analytic area specifying module 13, as an analytic area image $A_n(t_a)$ (a=1, 2, ...). The analytic area image extracting module 14 outputs the plurality of analytic area images $A_n(t_1)$, $A_n(t_2)$, ... extracted as above, sequentially to the storage 15.

The storage 15 stores the plurality of analytic area images $A_n(t_1)$, $A_n(t_2)$, ... of the analytic area $A_n$ extracted sequentially by the analytic area image extracting module 14. When the number of the stored analytic area images reaches a predetermined number (e.g., 32), the storage 15 outputs all the images to the calculating module 16.

The calculating module 16 calculates the ocean wave information of the analytic area $A_n$ based on the predetermined number of analytic area images $A_n(t_1)$, $A_n(t_2)$, ..., and $A_n(t_{32})$ outputted from the storage 15. Specifically, the calculating module 16 applies three-dimensional FFT to the predetermined number of analytic area images $A_n(t_1)$, $A_n(t_2)$, ..., and $A_n(t_{32})$ to calculate the information such as the wave period, the wave velocity, the wave direction, and the wave height, as the ocean wave information. Note that, although the ocean wave information is calculated by using the three-dimensional FFT in this embodiment, without limiting to this, any other method may be used. For example, the ocean wave information may be calculated by using a two-dimensional FFT or MUSIC method. Moreover, the specific calculation procedures of the ocean wave information by using the respective methods described above are not described in detail since they are known.

[Operation of Echo Signal Processing Device]

Figure 4:
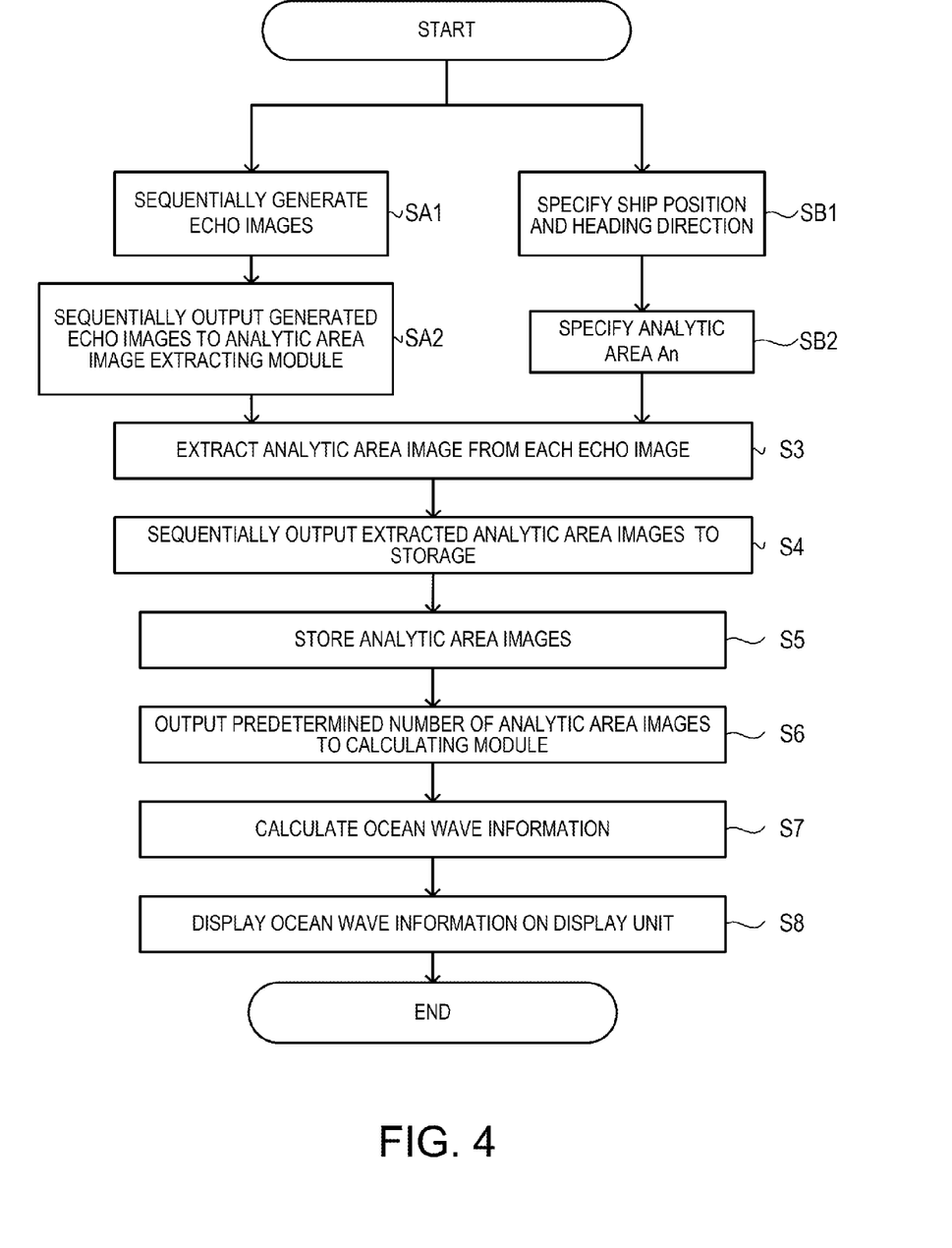
FIG. 4 is a flowchart for describing operation of an echo signal processing device illustrated in FIG. 1.

FIG. 4 is a flowchart for describing operation of the echo signal processing device 10. The flow in calculating the ocean wave information is described with reference to FIG. 4.

First, at SA1, the image generating module 11 generates the echo image within the predetermined area centering on the ship every time the antenna 4 fully rotates once. At SA2, the plurality of echo images generated as above are outputted sequentially to the analytic area image extracting module 14.

On the other hand, at SB1, the GNSS receiving module 12 receives the navigation signals to specify the absolute position of the ship and the heading direction thereof. Next, at SB2, the analytic area specifying module 13 specifies the analytic area $A_n$ based on the absolute position of the ship and the heading direction thereof. Specifically for example, the four locations forming the square area which is away from the ship by the predetermined distance in the heading direction of the ship are specified by the absolute positions, in other words, latitudes and longitudes. Further, the analytic area specifying module 13 specifies the rectangular area formed by the four locations as the analytic area $A_n$.

Next, at S3, the analytic area image extracting module 14 extracts, from each echo image outputted from the image generating module 11, the part of the echo image corresponding to the analytic area $A_n$, which is specified by the analytic area specifying module 13, sequentially, as the analytic area image $A_n(t_a)$.

Figure 5:
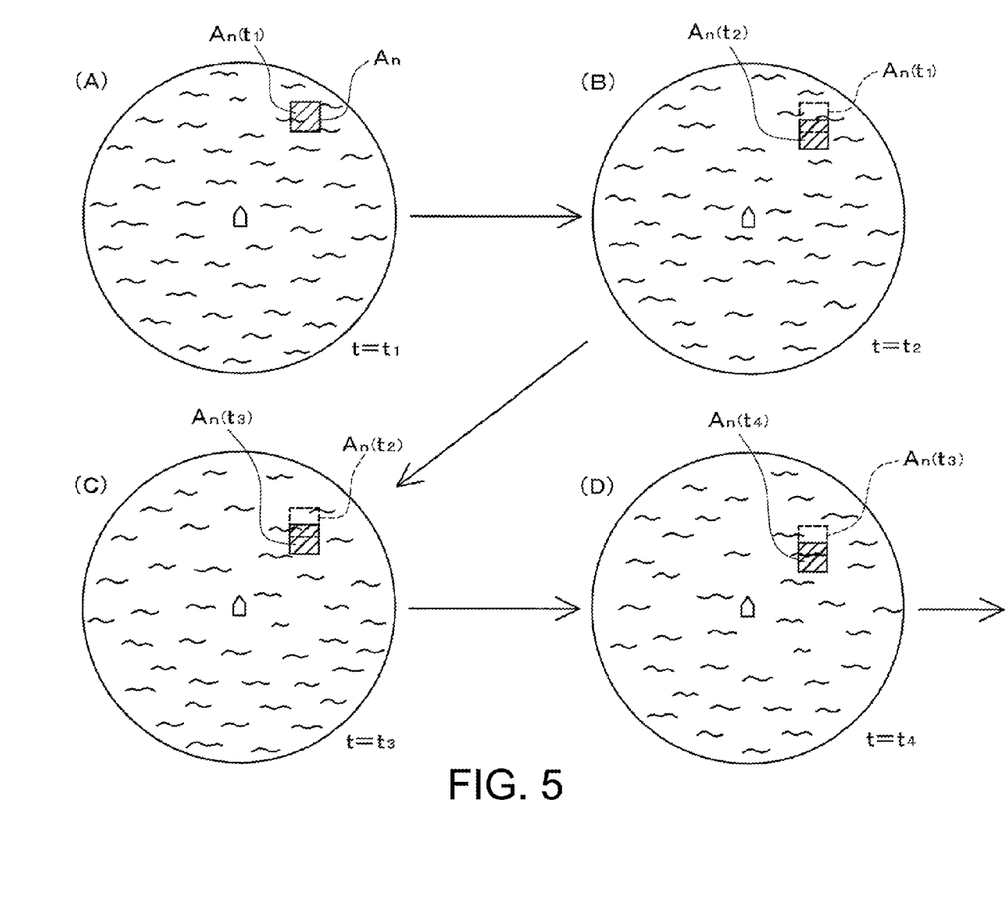
FIG. 5 shows views for describing positions of the analytic area in radar images generated at various timings.

Parts (A) to (D) of FIG. 5 are views illustrating horizontal areas centering on the ship, and for describing the positions of the analytic area $A_n$ in the echo images generated at different timings, respectively. As illustrated in FIG. 5, in the echo images generated centering on the position of the ship at different timings, the position of the analytic area $A_n$ specified by the absolute positions changes with time according to a traveling direction and a speed of the ship.

Next, at S4, the analytic area image extracting module 14 outputs the analytic area images $A_n(t_a)$ extracted at S3, sequentially to the storage 15.

The storage 15 stores the analytic area images $A_n(t_a)$ outputted sequentially from the analytic area image extracting module 14 (S5). Then, when the number of the stored analytic area images reaches the predetermined number (e.g., 32), the storage 15 outputs the analytic area images $A_n(t_1), A_n(t_2), \ldots,$ and $A_n(t_{32})$ to the calculating module 16 (S6).

Then, at S7, based on the predetermined number of analytic area images $A_n(t_1), A_n(t_2), \ldots,$ and $A_n(t_{32})$ outputted from the storage 15, the calculating module 16 calculates the ocean wave information by using the three-dimensional FFT. The ocean wave information calculated as above, as illustrated in FIG. 2, is displayed on the display unit 3 along with the echo image and the analytic area which are updated as needed (S8).

Moreover, with the wave radar apparatus 1 of this embodiment, while the calculating module 16 calculates the ocean wave information at S7, analytic area images $A_{n+1}(t_n)$ of the next analytic area $A_{n+1}$ specified immediately after the current analytic area $A_n$ by the analytic area specifying module 13, are stored in the storage 15 to be accumulated. Specifically for example, the GNSS receiving module 12 acquires the absolute position of the ship and the heading information before the number of the extracted analytic area images $A_n(t_a)$ corresponding to the analytic area $A_n$ reaches the predetermined number (32) required for calculating the ocean wave information. The next analytic area $A_{n+1}$ is specified based on the information, and then the analytic area image extracting module 14 extracts the analytic area images $A_{n+1}(t_a)$ corresponding to the newly specified analytic area $A_{n+1}$, from the sequentially generated image data. Then, the storage 15 stores the analytic area images $A_{n+1}(t_a)$. Here, the storage 15 stores the extracted analytic area images $A_n(t_a)$ corresponding to the analytic area $A_n$, and the extracted analytic area images $A_{n+1}(t_a)$ corresponding to the analytic area $A_{n+1}$, separately.

Figure 6:
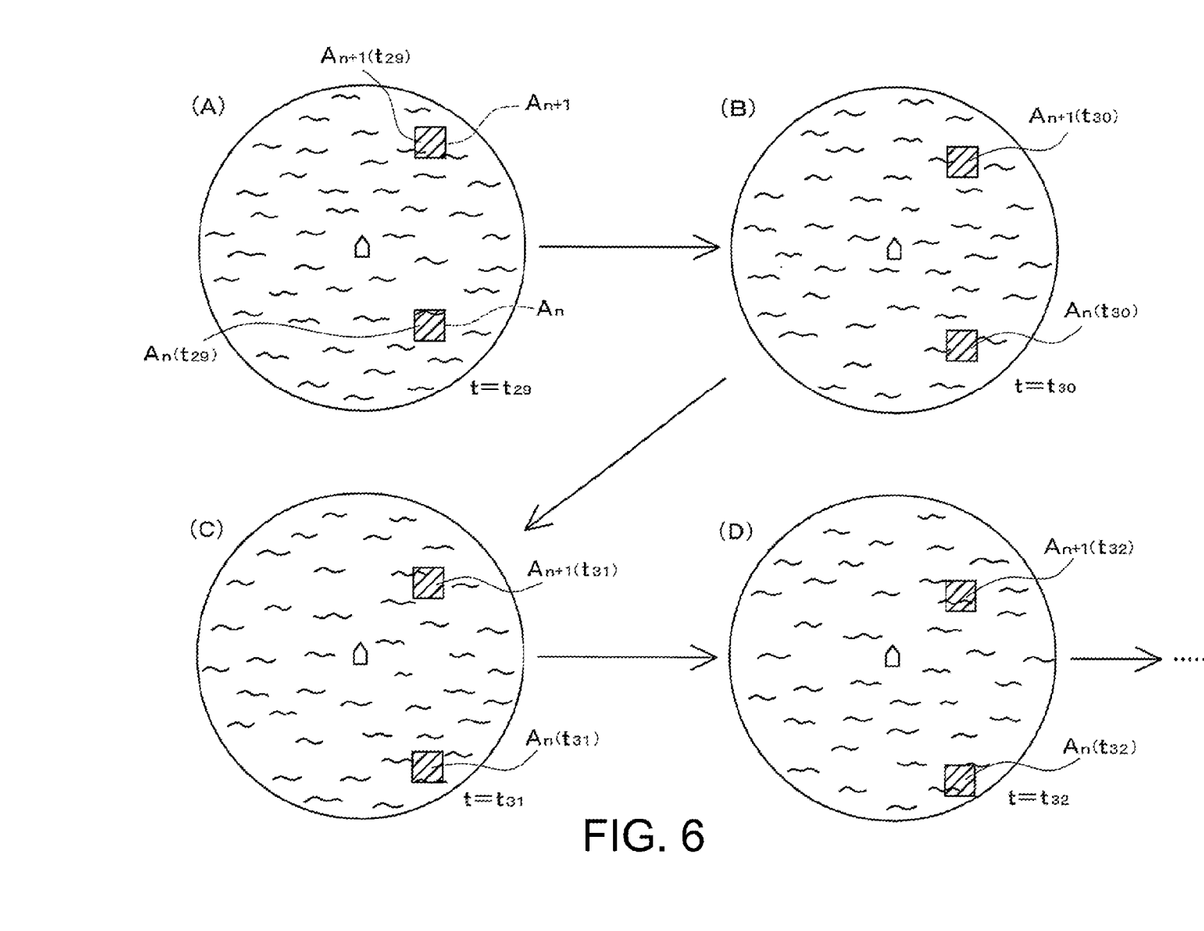
FIG. 6 shows views for describing positions of the analytic area in radar images generated at various timings different from the timings to generate the radar images in FIG. 5.

FIG. 6 shows views for describing a situation where before the predetermined number of extracted analytic area images $A_n(t_a)$ corresponding to the predetermined analytic area $A_n$ are stored in the storage 15, the next analytic area $A_{n+1}$ is specified and the analytic area images $A_{n-1}(t_a)$ corresponding to the analytic area $A_{n+1}$ are extracted. As described above, with the wave radar apparatus 1 of this embodiment, before the calculating module 16 ends the calculation of the ocean wave information based on the plurality of extracted analytic area images $A_n(t_a)$ corresponding to the analytic area $A_n$, the extracted analytic area images $A_{n-1}(t_a)$ corresponding to the analytic area $A_{n+1}$ specified next are accumulated in the storage 15. Thus, latest ocean wave information can be calculated sequentially at a comparatively short time interval. The ocean wave information calculated sequentially as above is displayed on the display unit 3 every time it is calculated. Thus, the operator can find out the latest ocean wave information.

Meanwhile, with a conventional wave radar apparatus, differently from the wave radar apparatus 1 of this embodiment, the analytic area to be the target area for calculating the ocean wave information is set with reference to the position of the ship. Specifically, the position of the analytic area is set to be fixed at the position with reference to the ship in each of the radar images updated sequentially with time. However, in this case, the position of the analytic area moves as the ship moves, and therefore, the image of the wave extracted from the analytic area contains a relative velocity component (Doppler component) to an actual wave. As a result, accurate echo signal information cannot be calculated.

Figure 7:
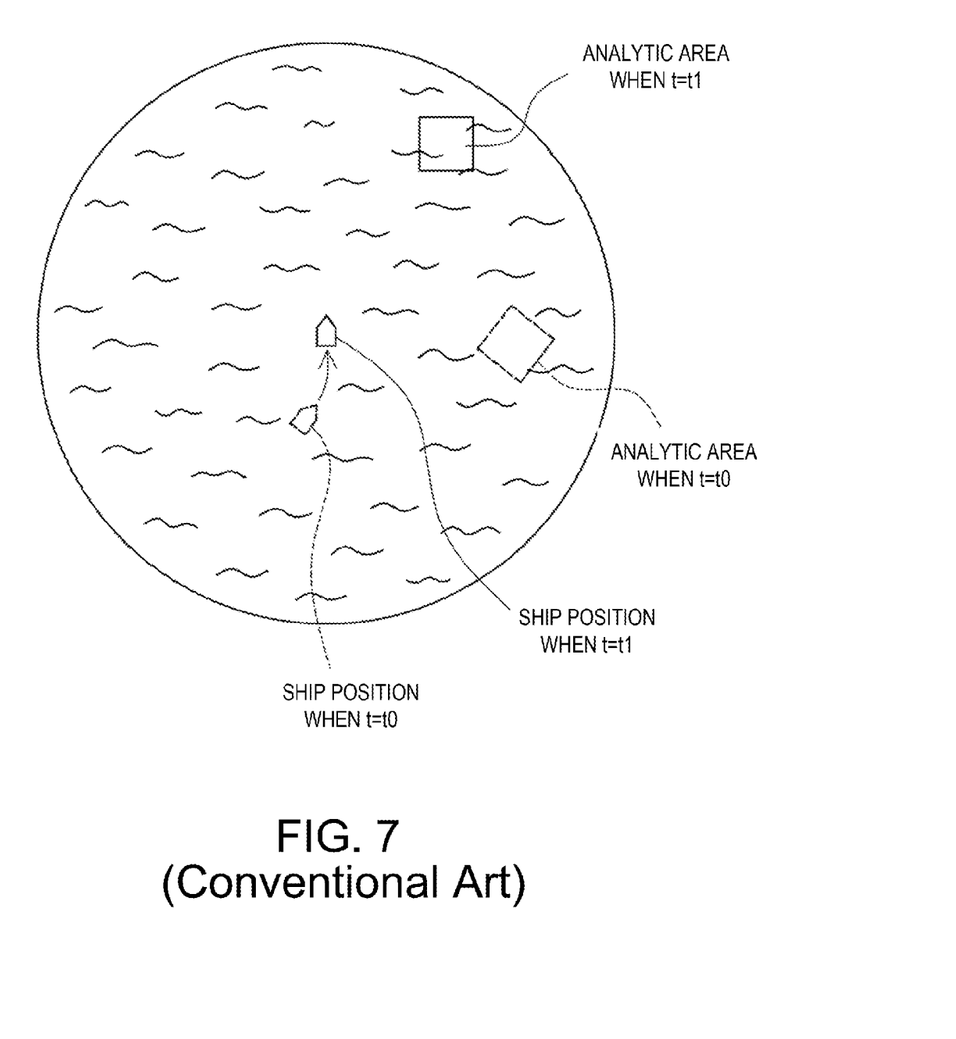
FIG. 7 is a view illustrating a horizontal area centering on the ship concerned and for describing a problem caused when specifying the analytic area by using relative positions to the ship concerned as a conventional wave radar apparatus.

FIG. 7 is a view illustrating a horizontal area centering on the ship and for describing a problem caused when specifying the analytic area with reference to the position of the ship as the conventional wave radar apparatus. As illustrated in FIG. 7, with the conventional wave radar apparatus, different analytic areas are extracted if the ship turns, and the echo signal information cannot be calculated.

On the other hand, with the wave radar apparatus 1 of this embodiment, the analytic area $A_n$ to be the target area for calculating the ocean wave information is specified by the absolute positions. Therefore, differently from the case where, as conventionally, the analytic area is set to the predetermined position with reference to the ship, the position of the analytic area can be fixed regardless to time lapse. Thus, the Doppler component contained in the conventional ocean wave information and a positional shift of the analytic area do not exist at all; as a result, accurate ocean wave information can be calculated.

[Effects]

As described above, with the echo signal processing device 10 of this embodiment, the analytic area $A_n$ to be the target area for calculating the ocean wave information is specified by the absolute positions. In this case, differently from the case where, as conventionally, the analytic area is specified by using the relative positions with reference to the position of the ship, a risk that the ocean wave information contains the Doppler component and the positional shift of the water surface within the analytic area can be eliminated.

Therefore, with the echo signal processing device 10, the ocean wave information can be calculated accurately.

Moreover, with the echo signal processing device 10, since the ocean wave information is sequentially calculated based on the echo images of the specified analytic area $A_n$, latest ocean wave information can be calculated sequentially. Thus, latest ocean wave information can be provided to the operator.

Moreover, with the echo signal processing device 10, while the calculating module 16 calculates the ocean wave information, the analytic area images of the next analytic area $A_{n+1}$ can be accumulated. Thus, the latest ocean wave information can be calculated sequentially at a comparatively short time interval.

Moreover, with the echo signal processing device 10, the accurate absolute positional information of the ship can be grasped by using the GNSS which is widely used.

Moreover, based on the wave radar apparatus 1 of this embodiment, a wave radar apparatus which can accurately calculate ocean wave information can be provided. Further, with the radar apparatus 1, since the wave velocity, the wave height and the like calculated by the echo signal processing device 10 are displayed on the display unit 3, the operator can suitably recognize the ocean wave information.

Although the preferred embodiment are described above, the present invention is not limited to this, and may be modified variously without deviating from the spirit and scope of the present invention.

[Modifications]

(1) With the wave radar apparatus 1 of this embodiment, the absolute positions of the four locations $P_1$ to $P_4$ are specified and the square area formed by the four locations is specified as the analytic area; however, it is not limited to this. For example, the four locations may be specified such that the analytic area becomes a rectangular, or the number of the locations may be three so that the analytic area becomes a triangle.

Figure 8:
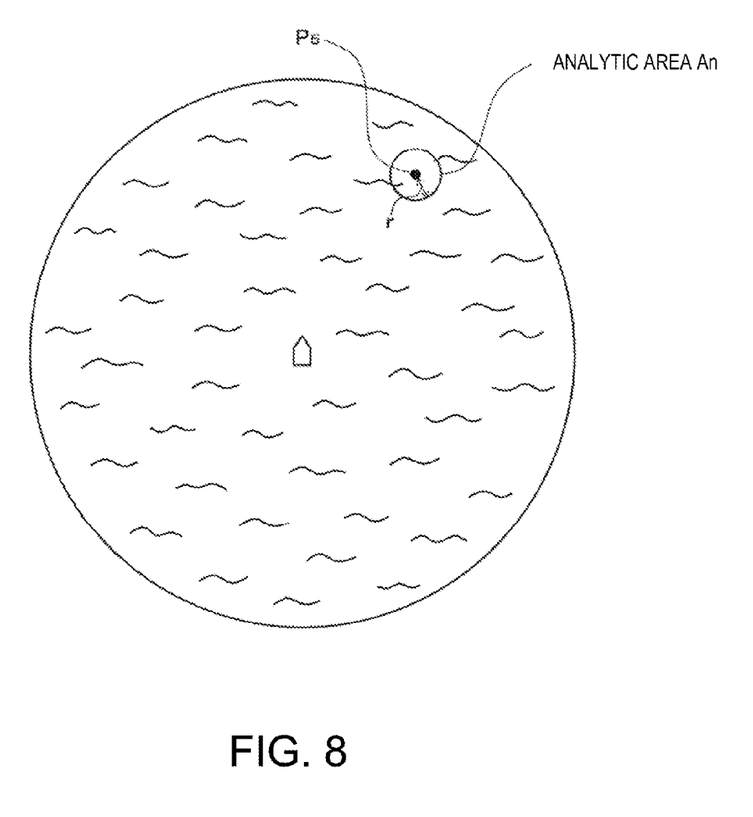
FIG. 8 is a view illustrating a horizontal area centering on the ship concerned and for describing setting of the analytic area with an echo signal processing device in a modification.

(2) FIG. 8 is a view illustrating a horizontal area centering on the ship and for describing setting of the analytic area with an echo signal processing device in this modification. In the above embodiment, a polygonal area formed by a plurality of locations is specified as the analytic area; however, it is not limited to this. Specifically, as the wave radar apparatus of this modification, a single location $P_5$ at a predetermined distance in a predetermined azimuth from the absolute position of the ship may be specified by the absolute position, and an area within a predetermined distance r from the location $P_5$ may be specified as the analytic area $A_n$.

Figure 9:
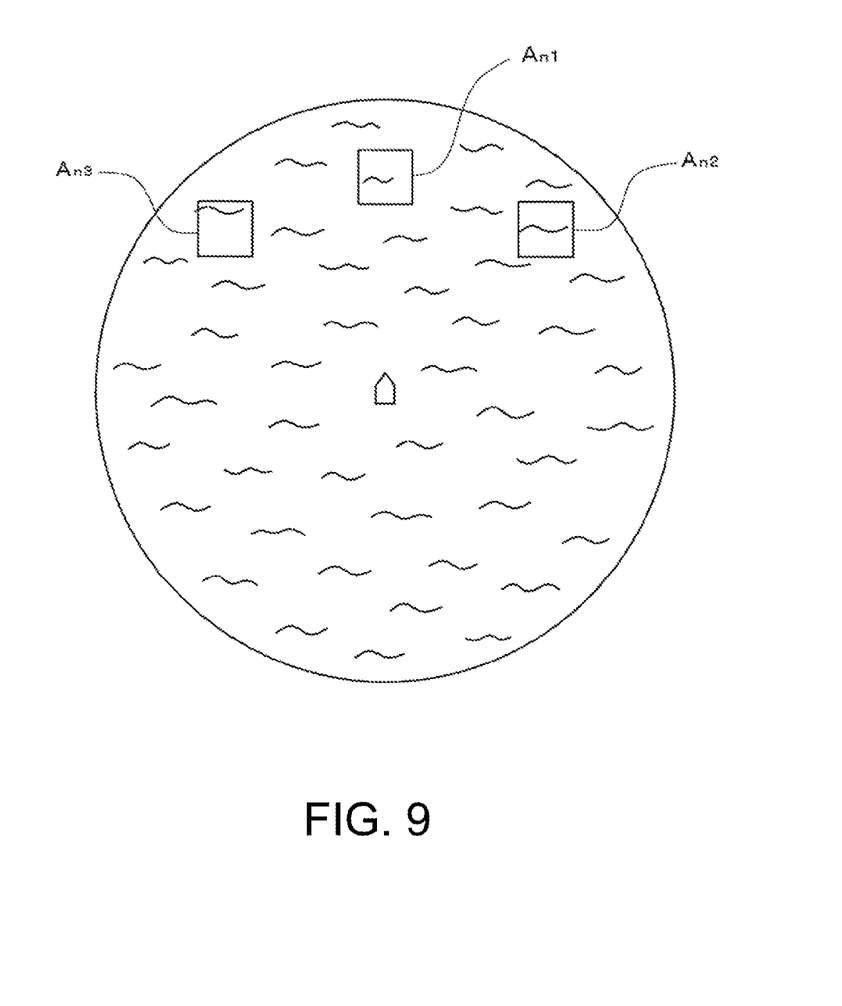
FIG. 9 is a view illustrating a horizontal area centering on the ship concerned and for describing setting of the analytic area with an echo signal processing device in another modification.

(3) FIG. 9 is a view illustrating a horizontal area centering on the ship and for describing setting of the analytic area with an echo signal processing device in another modification. With a wave radar apparatus of this modification, differently from the wave radar apparatus 1 of the above embodiment, three analytic areas $A_{n1}$, $A_{n2}$ and $A_{n3}$ are specified based on the absolute position of the ship at a certain timing. The three analytic areas $A_{n1}$, $A_{n2}$ and $A_{n3}$ can be set, for example, in the traveling direction of the ship, in a direction of 45 degrees to the starboard, and in a direction of 45 degrees to the port, respectively. By specifying the plurality of analytic areas $A_{n1}$, $A_{n2}$ and $A_{n3}$ based on the absolute position of the ship at the certain timing as above, although the calculation load of the calculating module increases, ocean wave information of a larger number of locations can be obtained.

The present invention can be applied widely as an echo signal processing device which calculates information regarding an echo signal received by an antenna for transceiving radio waves, and also as method and program for processing an echo signal, and a wave radar apparatus.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An echo signal processing device operatively coupled to an antenna and a display unit, the antenna being configured to transceive radio waves, the device comprising:
   a processor configured to execute a positional information acquiring module, an analytic area specifying module, and a calculating module; and
   a storage configured to store a plurality of analytic area images, wherein
   the image generating module, executed on the processor, is configured to generate an echo image at each of a plurality of timings, the echo images generated based on echo signals, each of the echo signals received by the antenna installed in a movable body and configured to transceive a radio wave that causes the echo signal, and the image generating module is configured to cause the display unit to display the echo images;
   the positional information acquiring module, executed on the processor, is configured to acquire absolute positional information of the movable body;
   the analytic area specifying module, executed on the processor, is configured to specify an analytic area in each echo image by an absolute position, based on the absolute positional information acquired by the positional information acquiring module;
   each of the analytic area images is a part of each of the echo images, the part corresponding to the analytic area; and
   the calculating module, executed on the processor, is configured to calculate echo signal information that is information regarding the echo signals from the analytic area, based on the plurality of analytic area images stored in the storage, and the calculating module is configured to cause the display unit to display the echo signal information.

2. The echo signal processing device of claim 1, wherein the positional information acquiring module sequentially acquires the absolute positional information of the movable body at a plurality of timings, and
   wherein the analytic area specifying module specifies the analytic area based on the absolute positional information of the movable body every time the absolute positional information is acquired.

3. The echo signal processing device of claim 2, wherein while the calculating module calculates the echo signal information, the positional information acquiring module acquires latest absolute positional information of the movable body at a timing that the storage can store an analytic area image of a next analytic area that is specified by the analytic area specifying module.

4. The echo signal processing device of claim 3, wherein the positional information acquiring module is provided as a GNSS receiving module configured to receive navigation signals.

5. A wave radar apparatus, comprising:
   an antenna to be installed in a ship that is a movable body for moving on water, and configured to transceive radio waves;
   the echo signal processing device of claim 4, configured to calculate wave information that is information regarding the echo signals from waves on the surface of the water, based on the plurality of echo images obtained using the echo signals received by the antenna; and
   a display unit configured to display the wave information calculated by the echo signal processing device.

6. A method of processing echo signals via an apparatus comprising a processor, a storage, an antenna, and a display unit, the method comprising:
   generating, via the processor, an echo image at each of a plurality of timings, the echo images generated based on the echo signals, each of the echo signals received by the antenna installed in a movable body and configured to transceive a radio wave that causes the echo signal, and causing the display unit to display the echo images;
   acquiring, via the processor, absolute positional information of the movable body;
   specifying, via the processor, an analytic area in each echo image by an absolute position, based on the absolute positional information of the movable body;

storing, via the storage, a plurality of analytic area images, each of the analytic area images being a part of each of the echo images, the part corresponding to the analytic area; and calculating, via the processor, echo signal information that is information regarding the echo signals from the analytic area, based on the plurality of analytic area images, and causing the display unit to display the echo signal information.

\* \* \* \* \*